United States Patent [19]

Hamaguchi et al.

[11] Patent Number: 4,646,284

[45] Date of Patent: Feb. 24, 1987

[54] HIGH DENSITY INFORMATION RECORD MEDIUM USING CARBON BLACK PARTICLES SURFACE-TREATED WITH SILICONE OIL

[75] Inventors: Toshiaki Hamaguchi; Kazuhira Namikawa; Mutsuaki Nakamura; Akio Kuroda; Toshio Akai, all of Yokohama, Japan

[73] Assignee: Victor Company of Japan, Ltd., Japan

[21] Appl. No.: 774,800

[22] Filed: Sep. 11, 1985

[30] Foreign Application Priority Data

Sep. 12, 1984 [JP] Japan .................................. 59-189748

[51] Int. Cl.⁴ ............................ C09C 1/56; H01B 1/06
[52] U.S. Cl. .................................. 369/276; 369/275; 369/288; 428/288
[58] Field of Search ............... 369/275, 286, 288, 276; 252/510, 511; 524/495; 428/288; 430/281; 204/61, 129; 260/998.16

[56] References Cited

U.S. PATENT DOCUMENTS

| | | | |
|---|---|---|---|
| 4,228,194 | 10/1980 | Meeder | 428/288 |
| 4,299,736 | 11/1981 | Datta | 369/276 |
| 4,472,295 | 9/1984 | Fox et al. | 369/276 |
| 4,547,545 | 10/1985 | Hamaguchi et al. | 252/511 |
| 4,558,087 | 12/1985 | Yamakawa et al. | 252/511 |

*Primary Examiner*—Raymond F. Cardillo
*Assistant Examiner*—Hoa T. Nguyen
*Attorney, Agent, or Firm*—Lowe, Price, LeBlanc, Becker & Shur

[57] ABSTRACT

High density information signal recording media of an electrostatic capacitance type, in which an information signal is recorded as geometric variations. The medium consists of a conductive resin composition which comprises a vinyl chloride resin, carbon black particles and a silicone oil lubricant. The carbon black particles are treated with a silicone oil to have the oil coated thereon.

5 Claims, No Drawings

HIGH DENSITY INFORMATION RECORD MEDIUM USING CARBON BLACK PARTICLES SURFACE-TREATED WITH SILICONE OIL

BACKGROUND OF THE INVENTION

1. Field of the Invention

This invention relates to high density information record media of an electrostatic capacitance type, such as video or digital audio discs, on which an information signal is recorded as geometric variations.

2. Description of the Prior Art

In certain information playback systems of the electrostatic capacitance type, an information signal is recorded as geometric variations by forming pits in a spiral plane or groove or in concentric planes or grooves, thereby obtaining high density information records such as video or digital audio discs. The individual pits of the record are very small and are arranged in a very high density. When the geometric variations are traced with a pickup stylus such as a diamond having an electrode, capacitive variations are established between the stylus and the record according to the geometric variations, so that the recorded information signal can be played back or reproduced.

Several kinds of information signal records of the electrostatic capacitance type have been proposed for use in the above type of electrostatic capacitance playback system. In one such record medium, an electrode is provided on one or both surfaces of a record substrate on which geometric variations have been press-molded according to an informatio signal. This permits formation of an electrostatic capacitance to be established between the record electrode and an electrode of pickup stylus during the course of reproduction operations. More particularly, the record substrate, on which pits are formed as desired, is covered with a metallic thin film several hundred angstrom in thickness, and also with several hundred angstrom thick dielectric layer overlaying the metallic film. The dielectric layer serves to prevent short circuiting of the electrodes and increases the dielectric constant between the electrodes. However, the record of this type needs a number of fabricating step including a press molding of the record substrate, depositing the metallic thin film and the dielectric layer, and the like. Thus, the fabrication is complicated and troublesome with the need of a relatively large-scale manufacturing apparatus. Thus, the production cost becomes very high.

Another type of information record medium is known. This medium is obtained by press-molding conductive plastic compositions comprising polyvinyl chloride resins, lubricants and several tens percent of carbon black so that an information signal is recorded as geometric variations. In this type of recording medium, an electrostatic capacitance is established between the electrode of a pickup stylus and the record itself. Thus, the step of depositing a metallic thin film on the substrate is not necessary. In addition, because fine particles of carbon black are individually covered with the resin, the dielectric film is not necessary as well. Thus, this type of record medium can be simply manufactured at a relatively low cost.

However, the record medium has a serious problem resulting from carbon black which is added to vinyl chloride resins in large amounts sufficient to impart a relatively high conductivity to the resin composition. In general, carbon black contains large amounts of impurities such as ashes. This is considering to be inevitable in view of the production process of carbon black. During or after the molding of the record medium such as video disc, the impurities contained in carbon black appear on the surface of the medium and render the medium surface irregular. The irregular surface gives an adverse influence on playback characteristics, e.g. dropout defects will be produced.

In order to solve the above problem, we proposed, in Japanese Laid-Open Patent Application Nos. 58-56243, 59-191153 and 59-215041, information signal recording media which made use of conductive carbon black which were washed with water or an acid to remove the impurities thereform. However, if carbon black is washed, its surface is activated, causing the pH of carbon black to lower. This will promote the thermal decomposition of vinyl chloride resins on heating during the molding operation.

Another problem involved in the recording medium of the electrostatic capacitance type is the wear of the record medium and the playback stylus by contact therebetween. The wear of the record medium can be mitigated by addition of a silicone oil such as dimethylpolysiloxane. However, the silicone oil tends to bleed out during the operation of press molding, so that pits cannot be formed exactly and the medium surface is undesirably contaminated with the oil. In addition, the use of the silicone oil is not so effective in preventing the wear of the playback stylus with an attendant problem that the electrode is separated from the stylus.

As a result of the investigation on these prior art problems, we found that the moldability and wear resistance of the record medium were greatly influenced by the surface characteristics of a conductive material, such as carbon black.

The record media of the type which is formed from a conductive vinyl chloride resin composition generally comprise a large amount of a conductive material. The vinyl chloride resin used serves as a binder for the particles of conductive material, i.e., the resin is considered to cover the individual particles.

The playback stylus usually moves at a speed of about 10 meters/second under a load of 400 to 500 kg/cm$^2$. Although the vinyl chloride resin may be imparted with lubricating properties by addition of suitable lubricants, the record medium will become defective in portions where the particles of a conductive material are exposed. These portions are considered to contribute to the shortage of life of the playback stylus and the medium per se.

As described before, the use of a lubricant such as dimethylpolysiloxane in large amounts undesirably brings about the bleedout at the tie of the press molding and causes the molding failure of pits, leading to the lowering of productivity.

SUMMARY OF THE INVENTION

It is accordingly an object of the present invention to provide information record media of an electrostatic capacitance type which are formed from conductive resin compositions comprising vinyl chloride resins and conductive particles whose surface properties are improved whereby the problems involved in the prior art can be overcome.

It is another object of the invention to provide information record media which have good resistance to wear while preventing the wear of a playback stylus to a minimum.

It is a further object of the invention to provide information record media using conductive resin compositions which have good moldability without causing any bleedout of lubricants and are tus suitable for making the media in high production efficiency.

The information record medium of the present invention is formed from a conductive resin composition which comprises a vinyl chloride resin, a silicone oil lubricant and carbon black particles. The present invention is characterized by the conductive carbon black particles which have a coating of a silicone oil by surface-treating the particles with the silicone oil. By the surface treatment of the carbon black particles with a silicone oil, the amount of the silicone oil lubricant added to the conductive resin composition can be reduced so that the unfavorable bleedout of the oil can be almost completely suppressed.

DETAILED DESCRIPTION AND PREFERRED EMBODIMENTS OF THE INVENTION

The conductive resin composition used to make an information record medium according to the invention should comprise a vinyl chloride resin, a silicone oil lubricant, and carbon black particles having a silicone oil coating on the surface thereof.

The carbon black particles may be any commercially available ones. In general, carbon black comprises various impurities including ashes, Ca, Na, K, Fe, Ni, Al, Cu, Zn, Mg, V and the like. Preferably, these impurities should be removed from carbon black prior to the surface treatment with a silicone oil. The removal of the impurities may be effected by any known methods. For instance, carbon black particles are dispersed in a diluted acid solution, such as diluted hydrochloric acid, and agitated for a sufficient time. After removal of the solution, the carbon black particles are washed with pure water until the concentration of chlorine ion in the resulting filtrate reaches below 1000 ppm. The thus washed particles are neutralized with an alkaline solution such as an aqueous ammonia solution and then washed with pure water until the concentration of chlorine ion is below 1 ppm. Thus, the ashes are almost completely removed from the carbon black particles.

The particles are subsequently dried and charged into a mixture of silicone oil and a solvent for the oil, followed by agitating and permitting the mixture to stand. Thereafter, the mixture is heated by a suitable means to remove the solvent therefrom to obtain the carbon black particles whose surface is coated or treated with the silicone oil.

For the surface treatment, the silicone oil is used or applied in an amount of from about 0.1 to 10 wt%, preferably from about 2.5 to 7 wt%, of the particles. The silicone oil may be the same as or different from a silicone oil used as the lubricant which will be described hereinafter. Preferably, dimethyl-polysiloxane having a viscosity of about 15 to 100 centipoises at 25° C. is used as both the coating and lubricant. The carbon black particles used should preferably have a size of below 10 μm in order to make a uniform dispersion in a vinyl chloride resin. The surface-coated carbon black particles are generally used in an amount of from 5 to 30 parts by weight per 100 parts by weight of a vinyl chloride resin.

The silicone oil lubricant may be any silicone oil ordinarily used for these purposes and includes, for example, dimethylpolysiloxane and derivatives thereof, and a number of other types of organopolysiloxanes. Typical organopolysiloxanes are described, for example, in U.S. Pat. No. 4,216,970 and Japanese Laid-open Patent Application No. 55-38699, which are incorporated herein by reference. The dimethylpolysiloxane may be represented by the following formula,

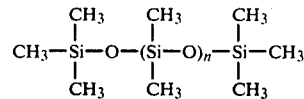

in which n is an integer of from 10 to 60. The organosiloxanes may be, for example, those of the following formulas,

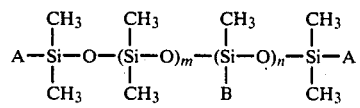

in which each A represents $CH_3$,

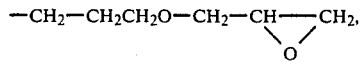

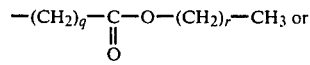

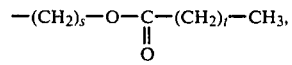

B represents 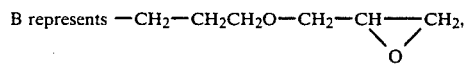

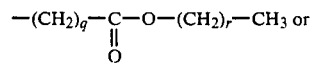

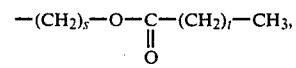

where each $q=3-7$, each $r=2-17$ provided that $q+r=7-30$, each $s=3-17$, each $t=2-17$ provided that $s+t=7-30$, $m=0-100$, $n=0-120$ provided that when $A=CH_3$, $n=2-120$, and $m+n=0-200$ provided that when A represents $CH_3$, $m+n=2-200$; and

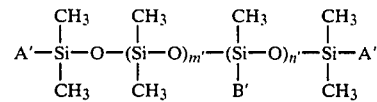

in which each $A'$ represents a methyl group or $-(CH_2)_{p'}-CH_3$ where $p'=3-19$, $B'$ represents $-(CH_2)_{p'}-CH_3$ where $p'=3-19$, $m'=0-100$, and $n'=0-120$ but $n'=2-120$ when A is a methyl group, provided that $m'+n'=0-200$. Preferably, dimethylpolysiloxane is used for the surface treatment and as the lubricant because of its ready availability. The silicone oil lubricant is generally used in an amount of 0.1 to less than 0.5 parts by weight per 100 parts by weight of a vinyl chloride resin. This amount is much smaller than that used in known information record media of the type formed from conductive resin compositions.

The vinyl chloride resins suitable for the purposes of the present invention are vinyl chloride homopolymer and vinyl chloride copolymers with other copolymerizable monomers ordinarily used for these purposes. Examples of the copolymers include vinyl chloride-vinyl acetate copolymers, vinyl chloride-ethylene copolymers, vinyl chloride-propylene copolymers, vinyl chloride-alkyl acrylate copolymers, graft copolymers of vinyl chloride monomer with acrylonitrile-styrene copolymers or ethylene-vinyl acetate copolymers, vinyl chloride-alpha-olefin copolymers, vinyl chloride-vinyl alcohol copolymers and the like.

Aside from these essential components, stabilizers such as metallic soaps including calcium stearate, organic tin compounds such as dibutyl tin esters and the like, other types of lubricants such as higher alcohols, fatty acids, esters thereof and polysaccharides may be added to the conductive resin composition.

For the fabrication of information record media, the essential components described above along with other additives, if necessary, are mixed in a high speed mixer such as the Henchel mixer by which the powders are sufficiently dispersed throughout the composition. Then, the mixture is melted in a highly kneadable extruder and pelletized, followed by pressing by a press machine to obtain video or audio discs are desired. Since the carbon black particles are surface-treated with a silicone oil, they are readily dispersed. In addition, a silicone oil lubricant is used only in small amounts, the pressing proceeds without involving bleedout of the oil lubricant.

The present invention is described in more detail by way of examples and comparative examples.

EXAMPLE 1

Three kilograms of carbon black (CSX-150A3, available from Cabot Co., Ltd, of U.S.A.), which had a bulk density of 0.17 g/cc, a weight loss on heating of 1.46%, an ash content of 0.94%, a pH of 9.6, and DBP oil absorption of 320 ml/100 g, and an $I_2$ adsorption of 1269 mg/g, was placed in a 100 liter flask containing 60 kg of a 5% hydrochloric acid solution. The mixture was agitated at 95° C. for 6 hours, from which water was then removed. Thereafter, pure water was added to the residue and mixed under agitation, followed by repeating the washing with water until the concentration of chlorine ion in the filtrate was less than 100 ppm. The carbon black particles were subsequently subjected to neutralization with an 5% ammonia solution, followed by repeated washing with water until the concentration of chlorine ion lowered to 1 ppm or below.

In this manner, the commercially available carbon black was washed with an aqueous solution of an inorganic acid and then with water to remove ashes therefrom. The deashed carbon black particles had a pH of 7.6.

The particles were vacuum-dried. The thus dried particles had impurities of 0.04–0.05% of ash, 46 ppm of Ca, 8–28 ppm of Na, below 5 ppm of K, 16 ppm of Fe, below 5 ppm of Ni, 114–121 ppm of Al, below 5 ppm of Cu, below 5 ppm of Zn, below 2 ppm of Mg and below 20 ppm of V.

Next, 40 liters of n-hexane and 135 g (4.5% based on carbon black) of dimethylpolysiloxane having a viscosity of 20 centipoises at 25° C., a specific gravity of 0.950 and a refractive index of 1.401 (KF-96, made by Shinetsu Chem. Ind. Co., Ltd.) were placed in an SUS jacketed autoclave having an inner capacity of 200 liters. To the mixture was added 3.0 kg of the deashed carbon black, followed by agitation for 30 minutes by the use of an agitator rotated at 10 r.p.m. and then standing for 30 minutes.

Thereafter, the autoclave was purged five times with nitrogen gas having a pressure of 3 $kg/cm^2$, into which steam was passed through the jacket to heat the content under agitation while reducing the pressure in the autoclave by means of a vacuum pump with a small amount of nitrogen gas being passed from the bottom of the autoclave. In order to avoid overheating of the inner walls of the autoclave, steam was passed while opening the bypass valve of a steam trap. The agitation was effected at one or two times per hour at a rate of 10 r.p.m. for about 2 minutes for each time.

After completion of evaporation of n-hexane by the heating, the particles were dried at a temperature not higher than 110° C. for several hours under a pressure of 150 Torr., followed by cooling by passage of cooling water through the jacket.

Thereafter, nitrogen gas was purged so that the autoclave was returned to normal pressures and heated to 30° C., after which the carbon black was collected.

The thus collected carbon black was dried at 110° C. for 3 days in an atmosphere of nitrogen gas, thereby obtaining silicone oil-coated carbon black.

Subsequently, one hundred parts by weight of a graft copolymer comprising vinyl chloride grafted to 3.2% of ethylene/vinyl acetate copolymer, having an average degree of polymerization of 500 (Toseace GK, made by Tokuyama Sekisui Ind. Co., Ltd.), 5 parts by weight of a dibutyl tin mercapto stabilizer (RES-1, by Sankyo Organic Synthesis Co., Ltd.), 2 parts by weight of an ester of an aliphatic acid and glycerine (RES-210, by Riken Vitamins Co., Ltd.), 0.5 parts by weight of a fatty acid and alcohol ester lubricant (RES-310, By Kao Soaps Co., Ltd.) and 0.3 parts by weight of dimethylpolysiloxane (RES-421, by Shinetsu Chem. Ind. Co., Ltd.) passed through a 0.2 μm mesh filter, were mixed and heated up to 110° C. by high speed agitation in the Henschel mixer. The surface-coated or treated carbon black, which had been passed through a foreign matter eliminator to remove foreign matters therefrom, was added to the mixture in an amount of 20 parts by weight, followed by heating to 110° to 120° C., high speed agitation for 15 minutes and cooling to room temperature.

Thereafter, the mixture was pelletized by the use of an extruder and the resulting pellets were passed through a foreign matter eliminator, followed by pressing by means of a video disc press machine to obtain video discs of the electrostatic capacitance type.

EXAMPLES 2-8

The general procedure of Example 1 was repeated using silicon oils, indicated in Table 1 below, which were used to coat the carbon black particles, thereby obtaining video discs.

TABLE 1

| Ex. No. | Silicone Oil | Viscosity (cps. at 25° C.) | Specific Gravity (25° C.) | Refractive Index (25° C.) | Amount of Silicone Oil (g) |
|---|---|---|---|---|---|
| 2 | dimethylpolysiloxane | 20 | 0.950 | 1.401 | 60 |
| 3 | " | 20 | 0.950 | 1.401 | 210 |
| 4 | " | 50 | 0.965 | 1.402 | 135 |
| 5 | " | 100 | 0.965 | 1.403 | 135 |

TABLE 1-continued

| Ex. No. | Silicone Oil | Viscosity (cps. at 25° C.) | Specific Gravity (25° C.) | Refractive Index (25° C.) | Amount of Silicone Oil (g) |
|---|---|---|---|---|---|
| 6 | epoxy group-substituted organopolysiloxane | 198 | 1.03 | 1.427 | 135 |
| 7 | ester group-substituted organopolysiloxane | 508 | 0.95 | 1.439 | 135 |
| 8 | alkyl group-substituted organopolysiloxane | 206 | 0.915 | 1.436 | 135 |

COMPARATIVE EXAMPLE 1

The general procedure of Example 1 was repeated except that the carbon black particles obtained after the deashing treatment were not coated with the silicone oil, thereby obtaining video discs.

COMPARATIVE EXAMPLE 2

The general procedure of Example 1 was repeated except that the carbon black particles used were deashed carbon black particles without silicone oil coating as used in Comparative Example 1 and that the dimethylpolysiloxane lubricant added to the resin composition was increased from 0.3 parts by weight of 0.5 parts by weight, thereby obtaining video discs.

COMPARATIVE EXAMPLE 3

The general procedure of Comparative Example 2 was repeated except that the amount of dimethylpolysiloxane was increased from 0.5 parts by weight to 1 part by weight, thereby obtaining video discs.

COMPARATIVE EXAMPLE 4

The general procedure of Comparative Example 2 was repeated except the amount of dimethylpolysiloxane was increased from 0.5 parts by weight to 1.5 parts by weight, thereby obtaining video discs.

The video discs of the electrostatic capacitance type obtained in Examples 1 to 8 and Comparative Examples 1 to 4 were each mounted in a reproducing apparatus and subjected to measurement of a degree of deterioration of Y-S/N. In this measurement, each disc was frame-frozen or still-reproduced for 3 hours while measuring the Y-S/N value of each disc at gray 50 IRE recorded at a position where it took 54 minutes from the outermost track of the video disc. The degree of deterioration of the signal-to-noise ratio was determined such that ten to twelve video discs of the respective examples and comparative examples were provided; and each disc was tested three times while changing the track every three hours. The tested discs whose degree of deterioration was within 3 dB were determined as acceptable, whereas discs whose degree of deterioration was over 3 dB or which involved the jumping of the stylus were determined as unacceptable.

The degree of deterioration is shown in Table 2 as acceptance rate by percent, along with moldability and the presence or absence of bleedout.

TABLE 2

| | Acceptance Rate by Percent | | | | |
|---|---|---|---|---|---|
| | After 1 hour | After 2 hours | After 3 hours | Moldability | Bleedout |
| Ex. | | | | | |
| 1 | 100 | 100 | 100 | good | no |
| 2 | 90 | 85 | 85 | good | no |
| 3 | 100 | 100 | 100 | good | no |
| 4 | 100 | 100 | 100 | good | no |
| 5 | 100 | 100 | 95 | good | no |
| 6 | 100 | 90 | 85 | good | no |
| 7 | 100 | 85 | 80 | good | no |
| 8 | 95 | 95 | 80 | good | no |
| Com. Ex. | | | | | |
| 1 | 40 | 25 | — | good | no |
| 2 | 70 | 60 | 60 | moderate | no |
| 3 | 100 | 95 | 85 | moderate | slight degree of bleedout |
| 4 | 100 | 95 | 95 | poor | considerable degree of bleedout |

As will be apparent from the above results, the video discs of the present invention are more resistant to wear and will prevent jumping of a playback stylus. In addition, the moldability is better for the present invention without involving an undesirable bleedout phenomenon.

What is claimed is:

1. A high density information signal recording medium of an electrostatic capacitance type in which signal information is recorded as geometric variations, the medium consisting of a conductive resin composition comprising a vinyl chloride resin, 5 to 30 parts by weight of carbon black particles individually having a coating of a silicone oil used in an amount of 0.1 to 10 wt% of the carbon black particles, and from 0.1 to less than 0.5 parts by weight of a silicone oil lubricant, both based on 100 parts by weight of the vinyl chloride resin.

2. An information signal recording medium according to claim 1, wherein the amount of the silicone oil coating is in the range of from 2.5 to 7 wt% of the carbon black particles.

3. An information signal recording medium according to claim 1, wherein the silicone oil for the coating and the silicone oil lubricant are each dimethylpolysiloxane having a viscosity of from 15 to 100 centipoises at 25° C.

4. An information signal recording medium according to claim 1, wherein the carbon black particles are deashed particles which are surface-treated with a silicone oil.

5. An information signal record medium according to claim 1, wherein the carbon black particles have a size of less than 10 μm.

* * * * *